United States Patent

Kawasato et al.

[11] Patent Number: 5,888,673
[45] Date of Patent: Mar. 30, 1999

[54] ORGANIC ELECTROLYTE CELL

[75] Inventors: Takeshi Kawasato; Kazuya Hiratsuka; Takeshi Morimoto; Manabu Tsushima; Manabu Suhara, all of Yokohama, Japan

[73] Assignee: Asahi Glass Company Ltd., Tokyo, Japan

[21] Appl. No.: 889,366

[22] Filed: Jul. 8, 1997

[30] Foreign Application Priority Data

Jul. 9, 1996 [JP] Japan ...................................... 8-179545

[51] Int. Cl.$^6$ ........................... H01M 6/14; H01M 10/40
[52] U.S. Cl. .......................... 429/329; 429/341; 429/342; 429/343; 429/231.4; 429/203; 29/623.1; 204/242
[58] Field of Search ...................................... 429/197, 194, 429/329, 341, 342, 343, 231.4, 203; 204/242; 29/623.1

[56] References Cited

U.S. PATENT DOCUMENTS

| 3,907,597 | 9/1975 | Mellors | 429/197 |
|---|---|---|---|
| 4,753,717 | 6/1988 | Yata et al. | 204/242 |
| 5,462,820 | 10/1995 | Tanaka | 429/197 X |

*Primary Examiner*—Donald R. Valentine
*Attorney, Agent, or Firm*—Oblon, Spivak, McClelland, Maier & Neustadt, P.C.

[57] ABSTRACT

An organic electrolyte cell comprising an organic electrolyte and an anode and/or a cathode of a carbonaceous material of a heat-treated material of an aromatic condensation polymer having a specific surface area of at least 1,500 m$^2$/g measured by BET method, wherein a solvent in the electrolyte is a mixed solvent containing a chain-like carbonate of the formula R$^1$OC(=O)OR$^2$ (wherein R$^1$ and R$^2$ are monovalent organic groups which may be the same or different) and sulfolane or its derivative.

20 Claims, No Drawings

ORGANIC ELECTROLYTE CELL

BACKGROUND OF THE INVENTION

1. Field of the Invention

The present invention relates to an organic electrolyte cell having a high working voltage and a high energy density.

2. Discussion of the Background

An organic electrolyte cell using an organic semiconductor having a polyacene type structure as an electrode material, wherein electrochemical doping and dedoping of electrolyte ions into the polyacene structure are employed, has a larger energy density as compared with an electric double layer capacitor employing electric charge accumulation in the electric double layer, and also has an excellent property in respect to repeating reliability of charge-discharge cycle as compared with a lithium secondary cell using lithium or its alloy as a cathode, and is widely used as a small coin-shaped cell mainly for memory backup use.

Up to now, an operating voltage for memory IC is mainly 5.0 V, and since this type of cell has an operating voltage of about 2.5 V, two unit cells are used in series for this purpose heretofore. However, recently, a driving voltage for IC is lowered, and it is therefore strongly demanded to provide a high voltage proof grade cell of at least 3.0 V which can backup the memory IC by one unit cell.

The voltage proof of this type of organic electrolyte cell is controlled mainly by electrochemical stability of an organic electrolyte. A conventional battery electrolyte employs an alkali metal salt or a quaternary onium salt as a solute and employs propylene carbonate, γ-butyrolactone, acetonitrile, dimethylformamide, sulfolane or their derivatives as a solvent.

Among them, sulfolane is a solvent excellent in oxidation resistance and having a high decomposition voltage. However, since its electric conductivity is remarkably lowered at a low temperature due to the high solidifying point (freezing point), it takes a long time for charging when the charging is conducted at a low temperature and also it causes a problem of lowering an output voltage due to an internal resistance when discharging a heavy-current.

SUMMARY OF THE INVENTION

An object of the present invention is to solve the above-mentioned problems in the prior arts and to provide an organic electrolyte cell which is free from decrease in an output voltage at a low temperature and has a high voltage proof and a high energy density.

That is, the present invention provides an organic electrolyte cell comprising an organic electrolyte and an anode and/or a cathode of a carbonaceous material of a heat-treated material of an aromatic condensation polymer having a specific surface area of at least 1,500 m$^2$/g measured by BET method, wherein a solvent in the electrolyte is a mixed solvent containing a chain-like carbonate of the formula R$^1$OC(=O)OR$^2$ (wherein R$^1$ and R$^2$ are monovalent organic groups which may be the same or different) and sulfolane or its derivative.

DETAILED DESCRIPTION OF THE INVENTION

A chain-like carbonate used in the present invention is an electrochemically stable solvent which has a low solidifying point (freezing point) and is accordingly free from viscosity rise even at a low temperature. This chain-like carbonate is expressed by the general formula R$^1$OC(=O)OR$^2$ wherein R$^1$ and R$^2$ are monovalent organic groups which may be the same or different. When the two groups are different, it is possible to prepare an electrolyte having a high concentration and consequently an electrolyte having a high electric conductivity and a satisfactory electric conductivity even at a low temperature can be provided.

When the chain-like carbonate having such properties is mixed with a solvent comprising sulfolane or its derivative having a high decomposition voltage, an electrolyte excellent in stability and having a high decomposition voltage and a satisfactory electric conductivity in the low temperature range can be obtained.

R$^1$ and R$^2$ are optionally selected from monovalent organic groups such as alkyl groups and aryl groups. The monovalent organic group may be a halogen-substituted organic group. When considering a melting point, a viscosity and a dielectric constant of a mixed solvent obtained, R$^1$ and R$^2$ are preferably any one of CH$_3$, C$_2$H$_5$, (CH$_3$)$_2$CH, CH$_3$(CH$_2$)$_2$ and CF$_3$CH$_2$. More preferable examples of the chain-like carbonate include ethyl methyl carbonate, methyl isopropyl carbonate, ethyl isopropyl carbonate, 2,2,2-trifluoroethyl methyl carbonate, diethyl carbonate and dimethyl carbonate.

In the present invention, sulfolane and a sulfolane derivative are preferable solvent components, and particularly sulfolane is preferable in view of a high decomposition voltage, a high oxidation resistance and a satisfactory compatibility with a chain-like carbonate. Examples of the sulfolane derivative include 3-methylsulfolane, 2,4-dimethylsulfolane and the like.

A mixing ratio of sulfolane or its derivative with a chain-like carbonate in a mixed solvent is appropriately selected in view of a solubility of a solute to the mixed solvent, a temperature range to be used and an electric conductivity required particularly at a low temperature. Also, in view of internal resistance, voltage proof and stability of an organic electrolyte cell, a solvent for the electrolyte is preferably a mixed solvent containing from 15 to 85 vol % of sulfolane or its derivative and from 85 to 15 vol % of a chain-like carbonate, more preferably a mixed solvent containing from 25 to 75 vol % of sulfolane or its derivative and from 75 to 25 vol % of a chain-like carbonate.

A solute contained in the electrolyte is preferably a quaternary onium salt. Particularly, in view of a solubility to a solvent, an electric conductivity and an electrochemical stability of its solution, preferable examples of the solute include an onium ion such as a quaternary ammonium ion having a cation of the formula N$^+$R$^3$R$^4$R$^5$R$^6$ or a quaternary phosphonium ion having a cation of the formula P$^+$R$^3$R$^4$R$^5$R$^6$. However, each of R$^3$, R$^4$, R$^5$ and R$^6$ is a C$_1$–C$_5$ alkyl group, four groups of which may be the same or at least two groups of which may be different. Particularly preferable examples include an asymmetric quaternary ammonium salt and an asymmetric quaternary phosphonium salt, at least two groups of which are different, since such an asymmetric quaternary salt has a high solubility to a solvent and a high electric conductivity in the present invention.

The anion of the quaternary onium salt is not specially limited, examples of which include BF$_4^-$, ClO$_4^-$, CF$_3$SO$_3^-$, PF$_6^-$, AsF$_6^-$, N(SO$_2$CF$_3$)$_2^-$, NO$_3^-$, Cl$^-$, Br$^-$, SO$_4^{2-}$ and the like. Among them, in view of an electric conductivity and an electrochemical stability, an anion selected from BF$_4^-$, ClO$_4^-$, CF$_3$SO$_3^-$ and PF$_6^-$ is preferable. Particularly preferable examples of the solute include salts prepared by combining any one of the above anions with any one of cations, e.g. tetraethylphosphonium, triethylmonomethylphosphonium, tetraethylammonium and triethylmonomethylammonium.

More concretely, $(C_2H_5)_3CH_3NBF_4$, $(C_2H_5)_3CH_3PBF_4$, $(C_2H_5)_4PBF_4$ and the like are preferably used. Also, in view of an electroconductivity and a stability at a low temperature of the electrolyte, the concentration of the solute in the electrolyte is preferably from 0.3 to 2.5 mol/l, more preferably from 0.5 to 2.0 mol/l.

A carbonaceous material used as an electrode material of the organic electrolyte cell of the present invention is a heat-treated material of an aromatic condensation polymer. The carbonaceous material preferably has a polyacene type structure and is preferably an insoluble unmeltable substrate.

The polyacene type structure is a structure having a plurality of benzene rings directly bonded by way of two nucleus carbon atoms between a benzene ring and its adjacent benzene ring and having many spaces among molecules. Into these spaces, cations of the solute are doped or dedoped by charging and discharging.

Also, when the carbonaceous material is activated to have a specific surface area of at least 1,500 $m^2/g$ measured by BET method, ions are smoothly doped and dedoped. A preferable specific surface area is from 1,700 to 3,000 $m^2/g$. Examples of the activating treatment to enlarge the specific surface area include activating treatment with water vapor, treatment with melted KOH, and the like.

Examples of the aromatic condensation polymer include a novolak resin, a resol resin, and the like, which are condensates of phenols and aldehydes. Among them, a resol resin is preferable, and it is heat-treated at a temperature of at most 700° C. and the heat-treated carbonaceous material preferably has a hydrogen/carbon atomic ratio of from 0.05 to 0.5. Further, it is preferable to use the carbonaceous material having an interplanar spacing $d_{(002)}$ of at least 0.38 nm as measured by X-ray diffraction.

Electrodes of the organic electrolyte cell of the present invention are composed of an electric current collector comprising the above carbonaceous material, a conductive agent such as carbon black imparting an electric conductivity, a binder (organic binder) and a metal or an electroconductive resin. The electrode is prepared by kneading a carbonaceous material, a conductive agent and a binder in the presence of a small amount of a solvent, forming the kneaded material into a sheet and bonding the formed sheet to an electric current collector.

In the present invention, examples of a separator inserted between an anode and a cathode include a polypropylene non-woven fabric, a glass fiber-mixed non-woven fabric, and the like.

The organic electrolyte cell of the present invention is applicable to any shape of structure such as a cylindrical shape cell having a belt-like electrode of a pair of anode and cathode drawn into a whirlpool, a coin-shape cell comprising a pair of disk-like electrodes, and the like.

EXAMPLES

Now, the present invention will be described in further detail with reference to Examples (Examples 1 to 7) and Comparative Examples (Examples 8 to 9), but it should be understood that the present invention is by no means restricted to the specific Examples.

Example 1

Ethanol was added to a mixture of 80 wt % of a carbonaceous material of a polyacene type structure having a hydrogen/carbon atomic ratio of 0.15 and a specific surface area of 1,850 $m^2/g$, which was prepared by heat-treating a novolak resin at 650° C. in an argon atmosphere and activating the heat-treated material with water vapor, 10 wt % of polytetrafluoroethylene and 10 wt % of carbon black, and the resulting mixture was kneaded and formed into a sheet. Then, the sheet was further rolled to a thickness of 0.6 mm and the electrode sheet thus obtained was punched into disks of a diameter of 12 mm.

The disk-like electrodes thus obtained were bonded inside a stainless steel case with a graphite type conductive adhesive on the cathode side and on the anode side, which functions not only as a current collector but also as a housing of a coin-shaped organic electrolyte cel, and subjected to vacuum heat treatment together with the stainless steel case to remove water and the like. The electrodes were impregnated with an electrolyte comprising a mixed solvent of 25 wt % of ethyl methyl carbonate and 75 wt % of sulfolane containing $(C_2H_5)_3CH_3NBF_4$ at a concentration of 1.5 mol/l, and a separator sheet made of a polypropylene non-woven fabric was interposed between two electrodes. The stainless steel case was crimp-sealed by using insulating gaskets to obtain a coin-shaped organic electrolyte cell having a diameter of 18.4 mm and a thickness of 2.0 mm.

Example 2

A coin-shaped organic electrolyte cell was produced in the same manner as in Example 1, except that a mixed solvent of 85 wt % of sulfolane and 15 wt % of ethyl methyl carbonate was used as a solvent for the electrolyte.

Example 3

A coin-shaped organic electrolyte cell was produced in the same manner as in Example 1, except that a mixed solvent of 70 wt % of sulfolane and 30 wt % of ethyl methyl carbonate was used as a solvent for the electrolyte, and that the electrolyte concentration was made 1.2 mol/l.

Example 4

A coin-shaped organic electrolyte cell was produced in the same manner as in Example 3, except that a mixed solvent of 75 wt % of sulfolane and 25 wt % of methyl isopropyl carbonate was used as a solvent for the electrolyte.

Example 5

A coin-shaped organic electrolyte cell was produced in the same manner as in Example 3, except that a mixed solvent of 75 wt % of sulfolane and 25 wt % of ethyl isopropyl carbonate was used as a solvent for the electrolyte.

Example 6

A coin-shaped organic electrolyte cell was produced in the same manner as in Example 1, except that a mixed solvent of 70 wt % of 3-methylsulfolane and 30 wt % of ethyl methyl carbonate was used as a solvent for the electrolyte, and that the electrolyte concentration was made 0.4 mol/l.

Example 7

A coin-shaped organic electrolyte cell was produced in the same manner as in Example 1, except that a carbonaceous material of a polyacene type structure having a hydrogen/carbon atomic ratio of 0.28 and a specific surface area of 2,200 $m^2/g$, which was prepared by heat-treating a resol resin at 650° C. in a nitrogen atmosphere and activating the heat-treated material with melted KOH, was used as the carbonaceous material, and that a mixed solvent of 25 wt % of ethyl methyl carbonate and 75 wt % of sulfolane containing $(C_2H_5)_3CH_3PBF_4$ at a concentration of 1.5 mol/l, was used as a solvent for the electrolyte.

Example 8

A coin-shaped organic electrolyte cell was produced in the same manner as in Example 1, except that propylene carbonate only was used as a solvent for the electrolyte.

Example 9

A coin-shaped organic electrolyte cell was produced in the same manner as in Example 1, except that sulfolane only was used as a solvent for the electrolyte, and that the electrolyte concentration was 1.0 mol/l.

Evaluation

With respect to each organic electrolyte cell, initial electric discharge capacitance (unit: F) and initial internal resistance (unit: Ω) were measured respectively at 20° C. and 0° C. Then, each cell was placed in a thermostat at 70° C., and after application of a voltage of 3.3 V for 1,000 hours, electric discharge capacitances (unit: F) and internal resistances (unit: Ω) were measured. From the changes in electric discharge capacitances and in internal resistances between the initial stage and after the application of voltage, a long term performance and a long term reliability of the respective cells under a high working voltage were estimated by extrapolation. The results are shown in Table 1.

As evident from Table 1, the organic electrolyte cell of the present invention has a low internal resistance at normal temperature and at a low temperature, and decrease in its capacity and increase in its internal resistance during application of a voltage as high as 3.3 V are little. Therefore, the organic electrolyte cell of the present invention can work with a high working voltage for a long time with an excellent reliability.

TABLE 1

| | Initial properties | | | | Properties after applying electric voltage per 1,000 hours | |
|---|---|---|---|---|---|---|
| | Capacity | | Internal resistance | | Capacity | Internal resistance |
| Examples | 20° C. | 0° C. | 20° C. | 0° C. | 20° C. | 20° C. |
| 1 | 1.99 | 1.93 | 14.2 | 15.1 | 1.80 | 199.3 |
| 2 | 1.98 | 1.89 | 14.9 | 16.3 | 1.75 | 205.5 |
| 3 | 2.01 | 1.85 | 15.2 | 16.1 | 1.78 | 214.2 |
| 4 | 1.92 | 1.80 | 15.4 | 16.8 | 1.69 | 239.1 |
| 5 | 1.90 | 1.75 | 15.6 | 17.4 | 1.66 | 245.2 |
| 6 | 1.73 | 1.44 | 26.0 | 28.1 | 1.48 | 257.3 |
| 7 | 1.95 | 1.91 | 13.4 | 14.6 | 1.73 | 231.4 |
| 8 | 2.01 | 1.98 | 9.7 | 9.9 | 0 | >1 MΩ |
| 9 | 1.89 | 0.81 | 22.3 | 29.8 | 1.03 | 401.6 |

The present invention provides an organic electrolyte secondary cell which can attain a working voltage as high as 3.3 V per unit cell, and by virtue of the high working voltage, it has a high energy density and such excellent properties that decrease in the capacitance and increase in the internal resistance during using are little. Consequently, the organic electrolyte cell of the present invention can backup an IC on a unit cell basis with a backup voltage of 3.0 V and has a high reliability. Thus, the present invention provides an organic electrolyte cell which has a high working voltage, a high energy density and excellent low-temperature properties, and which hardly deteriorates in respect of performances even during long-term operation.

What is claimed is:

1. An organic electrolyte cell comprising an organic electrolyte and an anode and/or a cathode of a carbonaceous material of a heat-treated mat rial of an aromatic condensation polymer having a specific surface area of at least 1,500 m$^2$/g measured by BET method, wherein a solvent in the electrolyte is a mixed solvent containing a carbonate of the formula $R^1OC(=O)OR^2$ (wherein $R^1$ and $R^2$ are monovalent organic groups which may be the same or different) and sulfolane or its derivative.

2. The organic electrolyte cell according to claim 1, wherein the carbonate is asymmetric.

3. The organic electrolyte cell according to claim 1, wherein the carbonate is ethyl methyl carbonate.

4. The organic electrolyte cell according to claim 1, wherein the solvent contains from 15 to 85 vol % of sulfolane or its derivative and from 85 to 15 vol % of a carbonate.

5. The organic electrolyte cell according to claim 1, wherein a solute in the electrolyte is a quaternary onium salt.

6. The organic electrolyte cell according to claim 5, wherein a cation of the quaternary onium salt is $N^+R^3R^4R^5R^6$ or $P^+R^3R^4R^5R^6$ (wherein $R^3$, $R^4$, $R^5$ and $R^6$ are $C_1$–$C_5$ alkyl groups, four groups of which may be the same or at least two groups of which may be different).

7. The organic electrolyte cell according to claim 6, wherein the quaternary onium salt is $(C_2H_5)_3CH_3NBF_4$, $(C_2H_5)_3CH_3PBF_4$ or $(C_2H_5)_4PBF_4$.

8. The organic electrolyte cell according to claim 5, wherein the electrolyte contains the quaternary onium salt at a concentration of from 0.3 to 2.5 mol/l.

9. The organic electrolyte cell according to claim 1, wherein the carbonaceous material has an atomic ratio of hydrogen/carbon of from 0.05 to 0.5 and has a polyacene structure.

10. The organic electrolyte cell according to claim 1, wherein $R^1$ and $R^2$ are independently selected from the group consisting of: $CH_3$, $C_2H_5$, $(CH_3)_2CH$, $CH_3(CH_2)_2$ and $CF_3CH_2$.

11. The organic electrolyte cell according to claim 1, wherein said solvent contains said carbonate, and said sulfolane or a sulfolane derivative selected from the group consisting of 3-methylsulfolane and 2,4-dimethylsulfolane.

12. The organic electrolyte cell according to claim 1, wherein said carbonate is at least one member selected from the group consisting of ethyl methyl carbonate, methyl isopropyl carbonate, ethyl isopropyl carbonate, 2,2,2-trifluoroethyl methyl carbonate, diethyl carbonate and dimethyl carbonate.

13. The organic electrolyte cell according to claim 1, wherein said carbonate is ethyl methyl carbonate.

14. A method of making the organic electrolyte cell of claim 1, comprising:

mixing said solvent and a solute to form said electrolyte;

impregnating said anode and/or said cathode with said electrolyte; and sealing said anode and/or cathode into a case, to form said organic electrolyte cell.

15. An organic electrolyte cell, comprising:

an electrolyte, an anode, and a cathode, wherein said anode and/or said cathode comprise a carbonaceous material prepared by heat-treating an aromatic condensation polymer, said carbonaceous material having a specific surface area of at least 1,500 m$^2$/g measured by BET method, said electrolyte comprises a solvent and a solute, said solvent comprising a carbonate and at least one member selected from the group consisting of sulfolane, 3-methylsulfolane and 2,4-dimethylsulfolane, and said carbonate has the formula R$^1$OC(=O)OR$^2$, where R$^1$ and R$^2$ are independently selected from the group consisting of CH$_3$, C$_2$H$_5$, (CH$_3$)$_2$CH, CH$_3$(CH$_2$)$_2$ and CF$_3$CH$_2$.

16. The organic electrolyte cell according to claim 15, wherein said solvent comprises 85 to 15 vol % of said carbonate.

17. The organic electrolyte cell according to claim 16, wherein said solute is present at a concentration of from 0.3 to 2.5 mol/l, and said carbonaceous material has an atomic ratio of hydrogen/carbon of from 0.05 to 0.5.

18. The organic electrolyte cell according to claim 15, wherein said solute is selected from the group consisting of quaternary ammonium salts and quaternary phosphonium salts.

19. A method of making the organic electrolyte cell of claim 15, comprising:

mixing said solvent and said solute to form said electrolyte;

impregnating said anode and said cathode with said electrolyte; and sealing said anode and said cathode into a case, to form said organic electrolyte cell.

20. An organic electrolyte cell comprising an organic electrolyte and an anode and/or a cathode of a carbonaceous material of a heat-treated material of an aromatic condensation polymer having a specific surface area of at least 1,500 m$^2$/g measured by BET method, wherein said electrolyte is a result of mixing a composition comprising a solute, a carbonate of the formula R$^1$ OC(=O)OR$^2$, and sulfolane or its derivative, wherein R$^1$ and R$^2$ are monovalent organic groups which may be the same or different.

\* \* \* \* \*